Patented Aug. 13, 1940

2,211,608

UNITED STATES PATENT OFFICE 2,211,608

POLYCHLOROPRENE ELECTRICAL INSULATION

Moyer M. Safford, Schenectady, N. Y., assignor to General Electric Company, a corporation of New York No Drawing. Application April 13, 1938, Serial No. 201,802

2 Claims. (Cl. 260—41)

The present invention is a continuation-in-part of my copending application, Serial No. 67,639, filed March 7, 1936, now Patent 2,118,017, dated May 17, 1938, and relates to electrical insulation. The invention is more particularly directed to improved electrical insulation compositions comprising plastic polymers of chloroprene.

A principal object of the invention is to produce an electrical insulation composition containing plastic polymers of chloroprene which exhibits low dielectric losses and low power factor particularly at elevated temperatures.

In my above-noted patent, which is assigned to the same assignee as the present invention, I have disclosed and claimed improved electrical insulation exhibiting low dielectric losses and low power factor at elevated temperatures. In my said copending application I have disclosed that plasticized polymerized vinyl halides, for example plasticized polymerized vinyl chloride, with which has been compounded an oxide of lead, or an oxide of lead and a finely divided carbon black, produces a composition which is rendered practically useful as insulation at higher voltages particularly higher A. C. voltages.

Further investigation has led to the discovery that the addition of oxide of lead, or oxide of lead and finely divided carbon black, will markedly improve the electrical properties of plastic polymers of chloroprene. These polymers are known to the trade as "Neoprene" and comprise essentially the plastic polymers of the chemical compound chloro-2-butadiene 1,3. The latter may be prepared, for instance, from monovinyl acetylene and hydrochloric acid. Upon subjection to ultraviolet light, plastic polymers of chloroprene are produced and these plastic polymers are herein referred to as polychloroprene. Polychloroprene (Neoprene), like plasticized polyvinyl chloride referred to in my above noted copending application, normally is very poor in electrical qualities, exhibiting high power factor and high dielectric losses at elevated temperatures. Although it has many desirable properties which make it superior to rubber for certain purposes, due to its poor electrical qualities its use as electrical insulation has heretofore been very limited. This will be apparent when the loss factor of pure "Neoprene" and its power factor at 90° C. are considered. The loss factor of pure "Neoprene" is 5100 at 90° C. and the power factor at 90° C. at 60 cycles is 99.9%.

When compounded with an oxide of lead or an oxide of lead and a finely divided carbon black, for example, with PbO and the carbon black known to the trade under the name of Dixie Special 102 or Kosmos BB, as noted in my copending application above referred to, it has been discovered that marked improvements in the electrical properties of the polychloroprene are obtained. This is strikingly illustrated by the following table which shows the improvement in power factor and reduction in electrical losses at 90° C. of modified polychloroprene compositions in accordance with my invention as compared with pure polychloroprene.

| Composition | | | Power factor 90° C. 60 cycles | $K_x$ watts loss per cycle per cubic centimeter ($e''$) |
|---|---|---|---|---|
| Polychloroprene | PbO | Carbon | | |
| Percent | Percent | Percent | Percent | |
| 100 | | | 99.9 | 5100 |
| 65 | 35 | | 82.0 | 12.00 |
| 57 | 35 | 8 (Dixie Special #102) | 7.9 | 1.00 |
| 57 | 35 | 8 (Kosmos BB) | 8.2 | 1.04 |

The foregoing table illustrates the tremendous reduction in electrical losses and power factor at 90° C. with the optimum percentages of lead oxide and carbon. Although improvement may be had with other percentages of the modifying agents, I have found that when the percentage of carbon black is increased over 12% the composition becomes an electrical conductor of high resistance.

My improved compositions comprising polychloroprene are especially useful in insulating power cable operating at higher voltages. They may be used in conjunction with other insulation as set forth in my above noted copending application.

My improved compositions may also be used with inert fillers such as the known fillers of the type employed for example in rubber insulation compounds, care being exercised to correctly proportion the oxide of lead, carbon and polychloroprene to produce the improved insulation of my invention.

What I claim as new and desire to secure by Letters Patent of the United States is:

1. An electrical insulation exhibiting low dielectric losses and lower power factor at elevated temperature comprising polychloroprene, an oxide of lead and a finely divided carbon black, the carbon black being present in proportion not over 12% of the composition.

2. A low loss, low power factor electrical insulation material having approximately the following composition: 57% by weight polychloroprene, 35% by weight PbO, 8% by weight finely divided carbon black.

MOYER M. SAFFORD.